United States Patent [19] [11] Patent Number: 4,984,417
Braun et al. [45] Date of Patent: Jan. 15, 1991

[54] EDGER WITH BELT BRAKING DEVICE

[75] Inventors: Stephen A. Braun, Horicon; Michael J. O'Neill, Mayville; Roger W. Curry, Horicon, all of Wis.; James R. Titze, Bloomington; Donald E. Niosi, Prior Lake, both of Minn.; Tetsuzo Fujikawa, Kobe, Japan; Makizo Hirata, Hyogo, Japan; Michio Nishimura, Kobe, Japan

[73] Assignee: Deere & Company, Moline, Ill.

[21] Appl. No.: 404,914

[22] Filed: Sep. 8, 1989

[51] Int. Cl.⁵ ............................................. A01D 34/84
[52] U.S. Cl. ...................................... 56/11.3; 56/11.6; 56/256; 172/15
[58] Field of Search ...................... 56/11.3, 11.6, 11.7, 56/16.9, 17.1, 17.5, 256, DIG. 6, DIG. 17; 30/276, DIG. 5; 172/13, 15, 17, 43, 356

[56] References Cited
U.S. PATENT DOCUMENTS

| 2,771,730 | 11/1956 | True | 56/256 |
| 2,847,813 | 8/1958 | Hanson, Jr. et al. | 172/15 |
| 3,193,996 | 7/1965 | Wellborn | 56/17.1 |
| 3,734,196 | 5/1973 | Mangum | 56/17.1 |
| 3,777,460 | 12/1973 | Mokros | 56/16.7 |
| 4,170,099 | 10/1979 | Owens | 56/256 |

Primary Examiner—Ramon S. Britts
Assistant Examiner—Terry Lee Melius

[57] ABSTRACT

The present invention relates to an edger with a belt braking device, including a belt driving device and a cutter blade, which are arranged at the side of an edger vehicle. A bearing housing portion of the cutter blade is provided for forward and rearward movement, a belt cover for covering the whole driving belt is fixed to the edger vehicle, and a belt braking device is arranged between the front end of the belt cover and the front driven pulley, whereby performing ON-OFF operation of a clutch and engagement/ disengagement of a brake simultaneously is enabled. In this way, the fixed belt cover can be compact and the operation for changing of working conditions can be simplified.

16 Claims, 5 Drawing Sheets

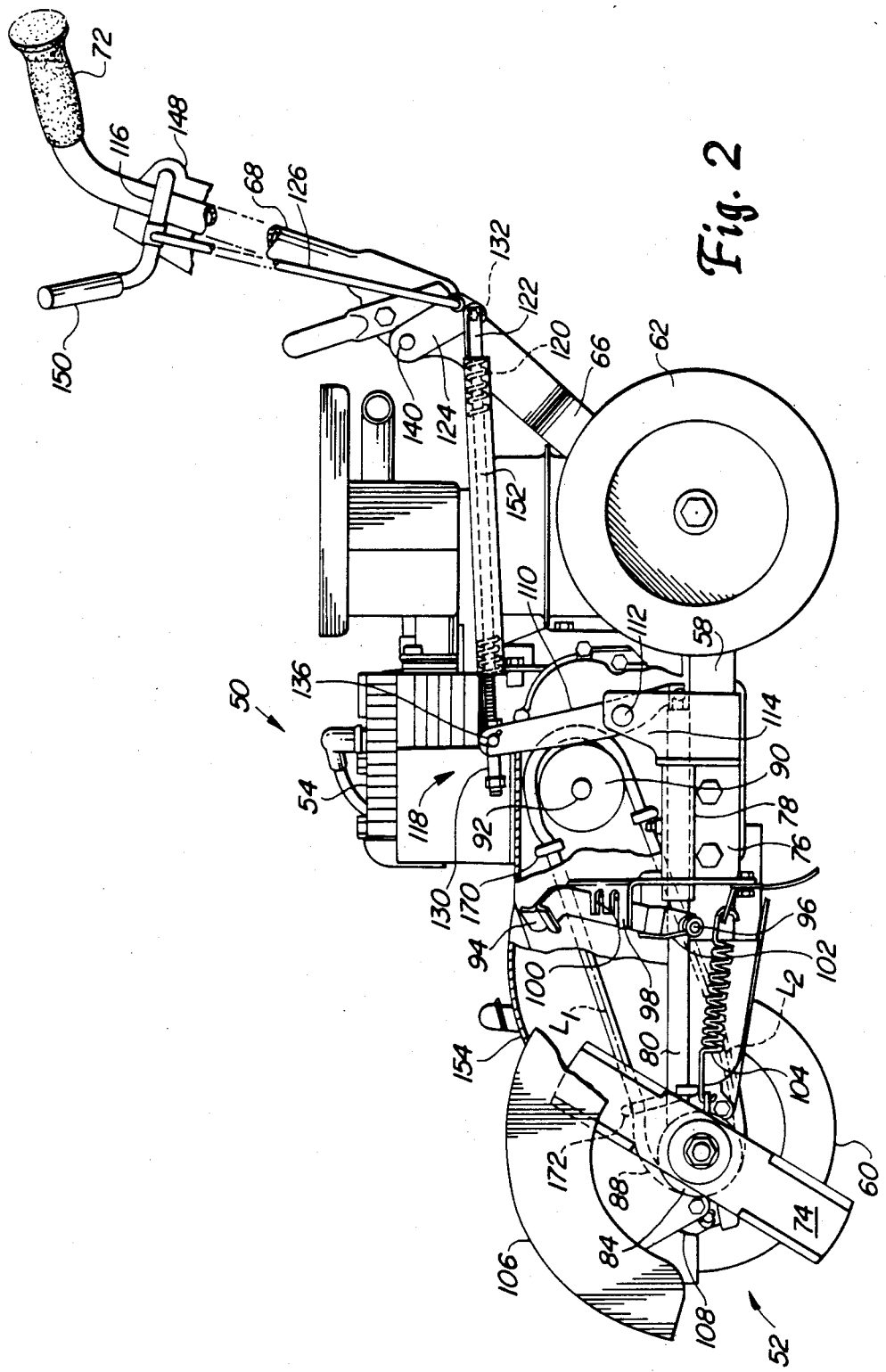

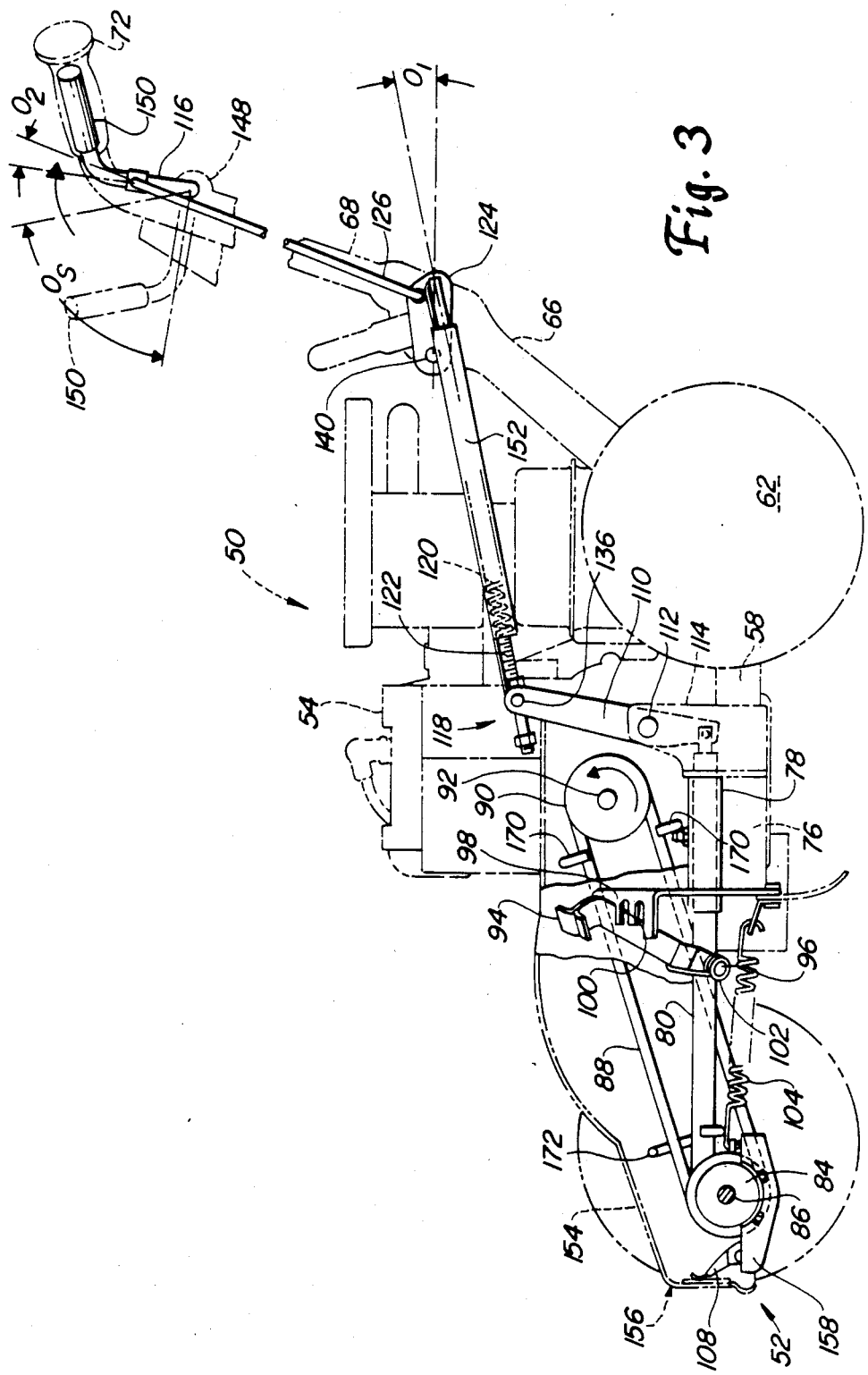

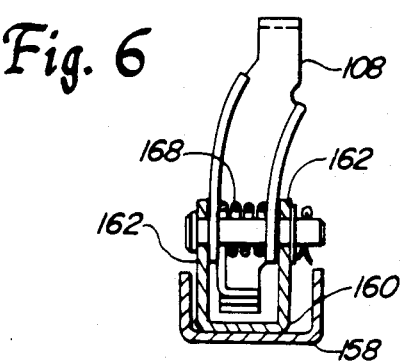
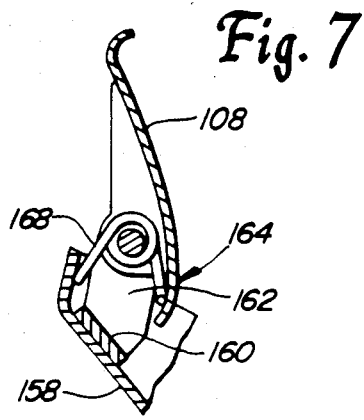
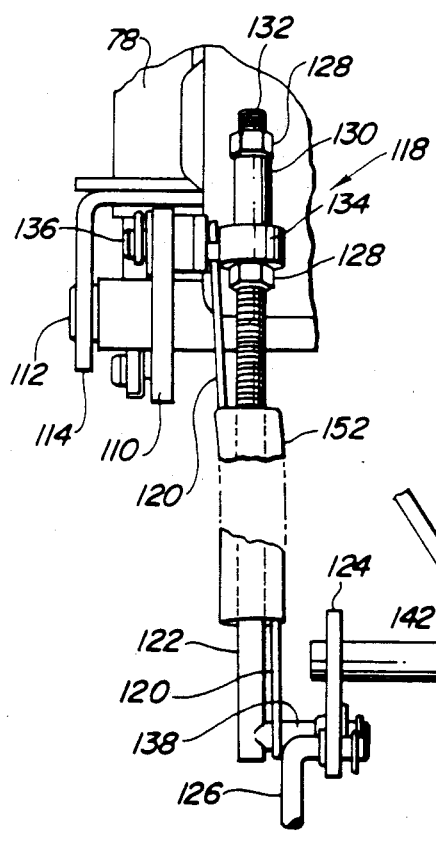
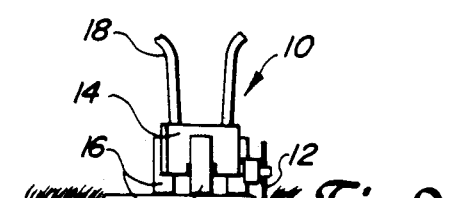
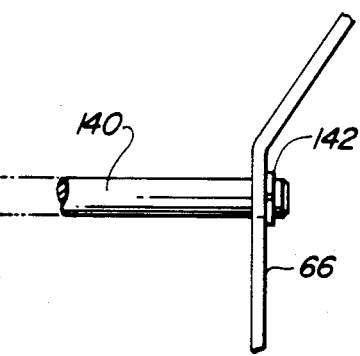
Fig. 9 (PRIOR ART)
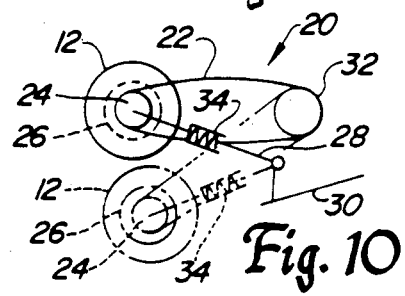
Fig. 10 (PRIOR ART)

EDGER WITH BELT BRAKING DEVICE

BACKGROUND OF THE INVENTION

1. Field of the Invention

The present invention relates to an edger for trimming grass and soil at an edge of a grassland such as a grassy lawn adjacent to a pavement, building or the like.

2. Description of Prior Art

In general, an edger of this kind includes a rotatable motor driven cutter blade arranged at the side of a travelling body or edger vehicle having wheels, and is controlled by an operator so that an edge of the grassland is trimmed by the edger as he manipulates rear operating handles.

In a cutter device of a conventional belt driven edger, the cutter drive belt is clutched or engaged by increasing the distance between two pulleys as the bearing housing of one pulley is moved away from the other pulley as by a swing arm. The swing arm also serves as the mechanism for adjustment of the cutter depth once the clutch has been engaged.

A first type of conventional belt driven edger provides a clutch lever at the rear operator station of the edger such that when the lever is pulled back by the operator, a linkage mechanism rotates the swing arm downward, thus engaging the drive belt. When the clutch lever is released by the operator, the swing arm is rotated upward by the force of a spring, thus disengaging the drive belt. The depth of the cut is adjusted at the side of the edger frame when the clutch is disengaged by adjusting the length of the linkage mechanism. Changing the length of the linkage mechanism will change the distance that the swing arm is rotated downward, thus changing the depth of the cut.

This first type of conventional belt driven edger disengages the clutch mechanism upon release of the clutch lever by the operator but permits the depth of cut to only be adjusted by disengaging the clutch and interrupting the edging operation.

A second type of conventional belt driven edger provides a control lever at the rear operator station of the edger that controls the rotation of the swing arm through a linkage mechanism. The swing arm is moved downward to engage the belt by shifting the control lever from its neutral position to a first position setting recess. The swing arm is further lowered and the depth of cut consequently increased by shifting the control lever into successive position setting recesses. The depth of the cutter blade is adjusted by shifting the control lever to different position setting recesses, and the belt is disengaged only when the operator returns the control lever to the neutral position.

This second type of conventional belt driven edger provides for cutter depth adjustment while the belt is engaged without interrupting the edging operation. However, it does not provide for a clutch disengagement when the operator leaves the operator station.

Further, neither type of conventional belt driven edger provide a mechanism for quickly stopping the rotation of the cutter blade when the drive belt has been disengaged.

Further, the wide range of upward and downward swinging movement of the swing arm makes it difficult to use a fixed belt cover for the whole belt driving device. A forward cover for the front driven pulley and a rear cover for the rear driving pulley must be independently arranged on conventional edger clutches, or a swingable cover must be provided, thus requiring costly manufacture and/or attachment of the belt cover.

Still another type of conventional edger drives the cutter blade by a driving shaft instead of a belt and employs a conventional centrifugal clutch. The operator engages the clutch by pulling back a clutch lever at the operator station. The clutch becomes disengaged and the cutter blade eventually stops when the operator releases the clutch lever.

The cutter blade is rotatably fixed to the edger frame and the depth of the cut is adjusted by adjusting the front wheel in an up-and-down direction. By adjusting the position of the front wheel, the height of the frame above the ground is adjusted, as well as the depth of the cutter blade which is fixed to the frame.

This conventional shaft driven edger provides for disengagement of the clutch as the operator leaves the operator station. It also provides for adjustment of the cutter depth while the clutch is engaged without interrupting the edging operation. However, as the blade encounters obstructions, the driving shaft receives the shock loads and transfers them to the engine which could potentially damage the engine.

SUMMARY OF THE INVENTION

An object of the present invention is to provide a belt driven edger that will spontaneously disengage the drive belt when the operator leaves the operator station.

Another object of the present invention is to provide a belt driven edger wherein the manipulation of the clutch can be effected independently of the adjustment of the depth of grass and soil cut, such that the operator need not leave the operator station or discontinue the edging operation in order to change the cutter depth.

Another object of the present invention is to provide a belt driven edger that incorporates a blade braking device that is activated as the clutch is disengaged.

Another object of the present invention is to provide a clutch device for a belt driven edger such that a single cover for the drive belt and pulleys can be easily and inexpensively manufactured and assembled.

In order to achieve the above objects, according to the present invention, a driven pulley of a belt driving device is supported by a bearing housing portion which supports a cutter blade. A substantially rearwardly extending head arm is also integrally fixed to the bearing housing portion and is supported by the body of the edger for forward and rearward movement. A tension return spring biases the head arm rearwardly. A belt is installed between the driven pulley and a rear driving pulley. A belt cover for covering the driving pulley, the driven pulley and the entire belt is fixed to the body of the edger. A braking lever is fixed to the bearing housing portion and is biased by a spring to press the back of the belt against the driven pulley. A releasing contact plate is arranged on the front part of the belt cover to contact with the upper portion of braking lever and rotate it, disengaging the lower portion of the braking lever from the belt. By pressing the rear portion of the head arm forward by means of a push lever, the belt is engaged. As the head arm is pressed forward, the upper portion of the brake lever meets the contact plate, causing the brake lever to rotate. This rotation causes the lower portion of the braking lever to disengage from the belt, allowing the belt driven pulley and cutter blade to rotate.

To more easily operate the clutch and maintain the clutch engaged condition, a pair of left and right upwardly extending operating handles are arranged above handle stays at the rear portion of the edger vehicle. A clutch lever is rotatably mounted in the vicinity of handle grips that are attached to the upper ends of the corresponding operating handles. The clutch lever has left and right lever grips such that each lever grip and corresponding handle grip can be held together by the hand of an operator.

This clutch lever is connected to the other end of the push lever by a linkage. The push lever is connected to a front link rod, which is in turn connected to a rotatable relay lever, which is in turn connected to the rear link rod, which is in turn connected to the clutch lever. As the clutch lever is pulled back by the operator to engage the clutch, the rear link rod is pulled back, which rotates the relay lever rearwardly, which pulls the front link rod rearwardly, which forces the upper portion of the push lever rearwardly. The lower portion of the push lever is consequently rotated forwardly, pushing the head arm and bearing housing portions forwardly. The movement of the bearing housing portion forwardly causes the belt to become engaged and the brake lever to release the belt.

In order to improve the operability of the clutch and the life of the belt, a belt tensioner spring and a belt extension adjuster are provided on link rods which connect the push lever to the clutch lever.

In order to aid the operator in holding the clutch lever against the handle grip in the engaged position, the clutch lever is inclined to approach the longitudinal direction of the rear link rod. Similarly, when the clutch lever is held against the handle grips, the rotatable relay lever is inclined to approach the longitudinal direction of the front link rod. This spring serves to maintain tension on the belt as the blade angle is changed and it also allows the bale handle to be pressed to the handle grip when manufacturing or assembly variations in the linkages would prevent such contact.

In addition, to facilitate maintaining the engaged clutch condition, the clutch lever is so arranged that the lever grips area positioned above or ahead of the handle grips when the clutch is applied.

In order to reduce the number of parts and to simplify the construction of the linkage, the lever axis of the relay lever is extended between a pair of left and right handle stays, whereby the relay lever is supported by the pair of handle stays.

When the operator pulls back the clutch lever, the head arm and the bearing housing portion are shifted forward through the linkage and push lever against the force of the tension returning spring, thus engaging the belt. At the same time, a constant tension force is applied to the belt by means of the tensioner spring. Upon the engagement of the belt, the brake lever is rotated against the force of the pressing spring by means of the contact plate, thus disengaging the brake lever from the back of the belt.

When the clutch is released by movement of the operator's hand from the clutch lever, the bearing housing portion of the cutter blade and the driven pulley mounted on the bearing housing portion are shifted rearward by means of the tension returning spring, whereby the belt is disengaged. Upon the disengagement of the belt, the braking lever is separated from the releasing contact plate and pushes the back of the belt against the driven pulley, thus preventing the belt, the driven pulley, and the blade from moving.

BRIEF DESCRIPTION OF THE DRAWINGS

FIG. 2 is a side view, in partial section, of the edger when the clutch is disengaged;

FIG. 3 is a side view, in partial section, of the edger when the clutch is applied;

FIG. 6 is an enlarged front view of the braking lever;

FIG. 7 is an enlarged side view of the braking lever;

FIG. 8 is an enlarged partial plan view of the linkage for adjusting the clutch;

FIG 9. is a front view showing a grass trimming operation condition; and

FIG. 10 is a schematic side view of a conventional clutch mechanism.

DESCRIPTION OF THE PREFERRED EMBODIMENTS

Figure 1:
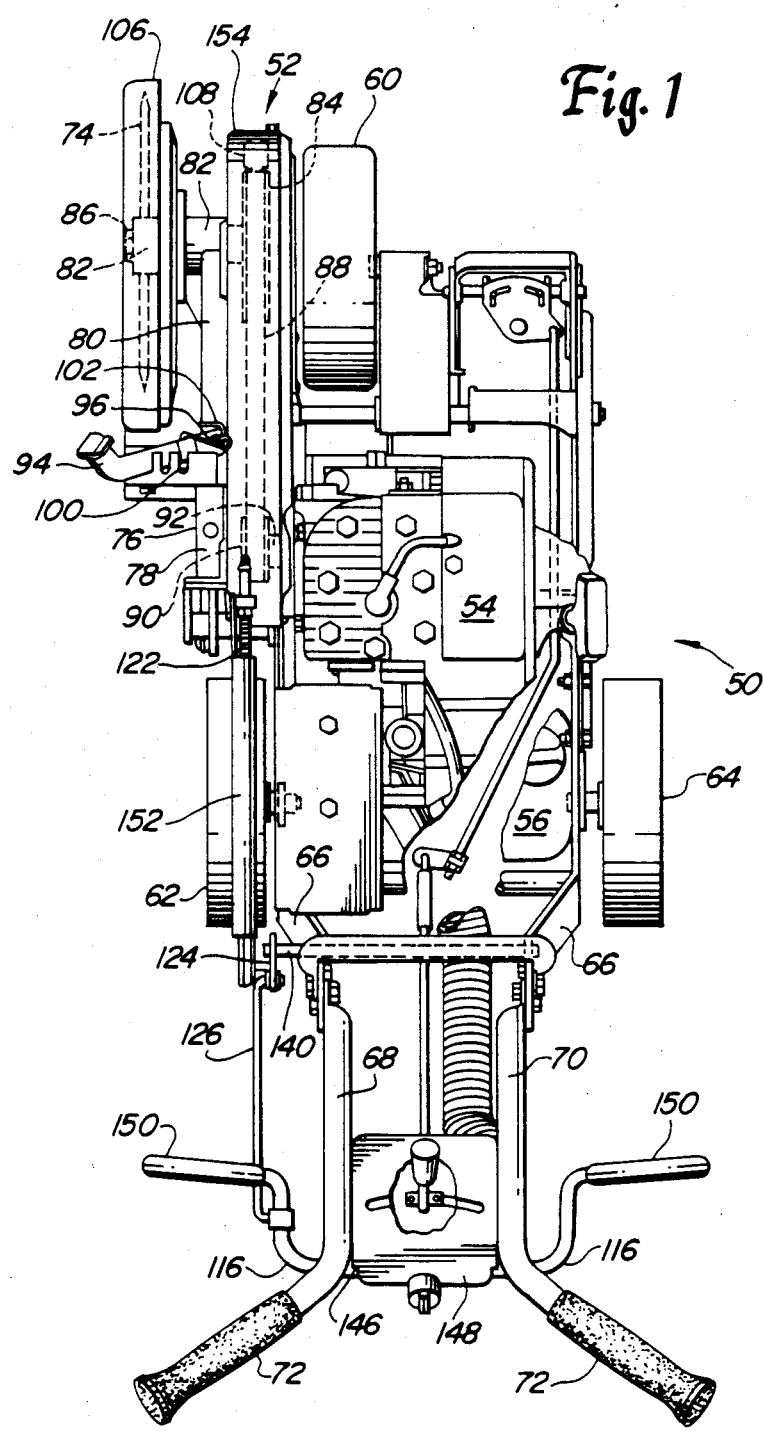
FIG. 1 is a plan view of an edger with a belt braking device according to the present invention.

Before explaining the present invention, a conventional edger will be explained briefly.

In general, as shown in FIG. 9, an edger 10 of this kind includes a rotatable belt driven cutter blade 12 arranged at the side of a travelling body or edger vehicle 14 having wheels 16, and is controlled by an operator so that an edge of a grassland is trimmed by the edger 10 as the operator manipulates rear control handles 18.

The conventional clutch mechanism 20, as shown in FIG. 10, is a structure wherein a cutter drive belt 22 is engaged and disengaged by swinging a front driven pulley 24 in an up-and-down direction. Conventional edgers do not contain a braking device for spontaneously stopping the driven pulley 24 when the belt 22 is disengaged.

Explaining the conventional structure which is shown in FIG. 10 with more detail, a bearing housing portion 26 of a cutter blade 12 is supported by a swing arm 28 which is carried on a pivot shaft 30. The belt 22 is engaged as the distance between pulleys 24 and 32 is increased when the bearing housing portion 26 is lowered due to rotation of the swing arm 28. The belt 22 is tensioned by a tensioner spring 34 arranged at an intermediate position on the swing arm 28. The spring 34 serves to urge the swing arm 28 downwardly so that the belt 22 is tightly entrained around the pulleys 24, 32.

However, the Wide range of upward and downward swinging movement of the swing arm 28 does not allow the use of a fixed belt cover for the entire belt driving device. A forward cover for the front driven pulley 24 and a rear cover for the rear driving pulley 32 must be independently arranged, or a swingable cover must be provided, thus requiring expensive manufacture and/or attachment of the belt cover.

Further, in the braking operation, since the driven pulley 24 is not spontaneously stopped or braked, the cutter blade 12 mounted on the driven pulley 24 will continue to rotate for some time after the belt 22 is disengaged.

Conventional belt driven edgers do not contain both an automatic blade shut-off safety feature and a cutter depth that is adjustable during operation of the edging. One type of conventional belt driven edger automatically shuts off the cutter blade when the operator releases a clutch lever, but does not provide for cutter depth adjustment during edging operation. The other type of conventional edger provides for cutter depth adjustment during operation, but does not contain an automatic shut-off safety feature.

Next, the present invention will be fully explained.

FIGS. 1, 2 and 3 show an edger 50 with a belt braking device 52, according to the present invention. In the plan view of FIG. 1, the edger vehicle 50 has an engine 54 and a fuel tank 56 mounted on the frame 58 of the vehicle, as well as one front wheel 60 and a pair of left and right rear wheels 62, 64. A pair of left and right operating handle stays 66 are arranged at the rear end portion of the frame 58, and a pair of left and right upwardly extending operating handles 68, 70 are fixed to the handle stays 66. Handle grips 72 are arranged on upper ends of the operating handles 68, 70. A shaft (not shown) for supporting the front wheel 60 is supported in such a manner that the position of the shaft can be adjusted with respect to the frame 58.

An edger mechanism such as a cutter blade 74 and the like is arranged at, for example, the left side of the edger vehicle 50.

Looking now to FIGS. 1, 2 and 3, a bracket 76 is fixed to the left side of the frame 58, and a tubular arm guide 78 is fixed to the bracket 76. A cylindrical head arm or elongated member 80 is inserted into and supported by the arm guide 78 in such a manner that the head arm 80 can be moved in the longitudinal direction and can also be swung about its own axis. A bearing housing portion or support housing 82 is fixedly mounted to the front end of the head arm 80. A cutter blade 74 and a driven pulley 84 are fixedly mounted on a cutter shaft or shaft means 86 which is rotatably supported by the bearing housing portion 82. The front end portion of a driving belt 88 is entrained and supported on the driven pulley 84, and the rear end portion of the driving belt 88 is entrained and supported on a driving pulley 90 which is fixed to an output shaft 92 of the engine 54.

An adjuster lever 94 which can adjust an angle of inclination of the cutter blade 74 is rotatably mounted on the head arm 80 through a pin 96 for up and down swinging movement, as viewed in FIGS. 2 and 3. A fin-shaped engagement plate 98 is integrally formed on the front end portion of the bracket 76, and contains a plurality of engagement slots 100 formed therein and spaced apart in a circumferntial relation to the head arm 80. Accordingly, by selectively engaging the adjuster lever 94 with one of the engagement slots 100, the cutter blade 74 can be inclined transversely to about 20° from the vertical position. The adjuster lever 94 is normally biased toward the engagement plate 98 by means of a torsion spring 102.

A tension return spring 104 (shown best in FIGS. 2 and 3) for biasing the bearing housing portion 82 rearwardly extends between the bearing housing portion 82 and the front end of the bracket 76. A blade guard 106 for covering the cutter blade 74 is mounted on the bearing housing portion 82, and a pressing lever 108 which will be explained later is also provided.

A rear end portion of the head arm 80 extends rearwardly from the arm guide 78 and is pivotally connected to the lower end of a push lever 110 (see FIGS. 2, 3 and 8).

The push lever 110 is rotatably supported by a lever shaft 112, which is in turn supported by a bracket 114. The upper end of the push lever 110 is operatively connected to a clutch lever 116 positioned at an upper portion of the handles 68-70, through adjuster 118, rearwardly extending tensioner spring 120, rearwardly extending front link rod 122, relay lever 124 and the upwardly extending rear link rod 126.

FIG 8. shows an enlarged plan and partial view of the adjuster 118. The adjuster 118 includes a pair of front and rear nuts 128 and a spacer boss portion 130 extending therebetween. A front male threaded portion 132 of the front link rod 122 is provided so that the front nut 128 can be moved in a longitudinal direction for adjustment. A ring-shaped or annular slider 134 is mounted on the boss portion 130 for longitudinal movement. A leftwardly extending pin 136 is formed on the slider 134 and inserted into an upper boss portion of the push lever 110. The front end of the tensioner spring 120 is connected to the pin 136.

FIG. 8 also shows a back view of the relay lever 124. The rear end of the tensioner spring 120 is connected to the rear end shaft portion 138 of the front link rod 122. The rear end shaft portion 138 and the lower bent portion of the rear link rod 126 are engaged by the lower end of the relay lever 124. The relay lever 124 is provided at its upper end with a horizontal lever shaft 140 formed integrally therewith. The lever shaft 140 passes through the left handle stay 66 and extends through the right handle stay 66. The lever shaft 140 is rotatably supported by the left and right handle stays 66 and is prevented from slipping out of the handle stays 66 by means of a snap ring or washer 142.

The rear link rod 126 extends upwardly along the left handle stay 66 and the left operating handle 68 (FIGS. 1 and 2), and is pivotally connected to the clutch lever 116. The clutch lever 116 includes a rotatable shaft portion 146 which extends beneath the left and right handles 68-70. The shaft portion 146 is rotatably supported by the handles 68-70 through a bracket 148 below and near the handle grips 72. Further, the clutch lever 116 is provided on both its ends with lever grips 150 which can be rotated back to meet the handle grips 72. In this position, the lever grips 150 can be held in contact with the handle grips 72 by either of the operator's hands.

The lever grips 150 of the clutch lever 116 are so constructed that, when they are pulled back to apply the clutch, they are positioned ahead of the corresponding handle grips 72 as shown by a solid line in FIG. 3, and the angle $\theta_2$ between the rear link rod 126 and the clutch lever 116 is minimized. The clutch lever 116 is prevented from rotating beyond the longitudinal direction of the rear link rod 126 when the lever grips 150 come in contact with the handle grips 72.

Further, the inclination of the relay lever 124 is such that, when the clutch is applied, an angle $\theta_1$ between the relay lever 124 and the front link rod 122 is minimized. Minimizing these angles $\theta_1$ and $\theta_2$ allows the operator to more easily hold the lever grips against the force of the return spring 104.

The spring force of the tensioner spring 120 positioned between the push lever 110 and the relay lever 124 is selected to be stronger than the spring force of the tension return spring 104. The tensioner spring 120 is covered by a tubular rubber wrap 152.

The belt driving device constituted by the pulleys 84, 90 and the driving belt 88 is covered by an integral belt cover 154 which is fixed to the frame 58. The longitudinal length of the belt cover 154 is so selected that the bearing housing portion 82 can be shifted in the longitudinal direction within the belt cover 154.

Figure 5:
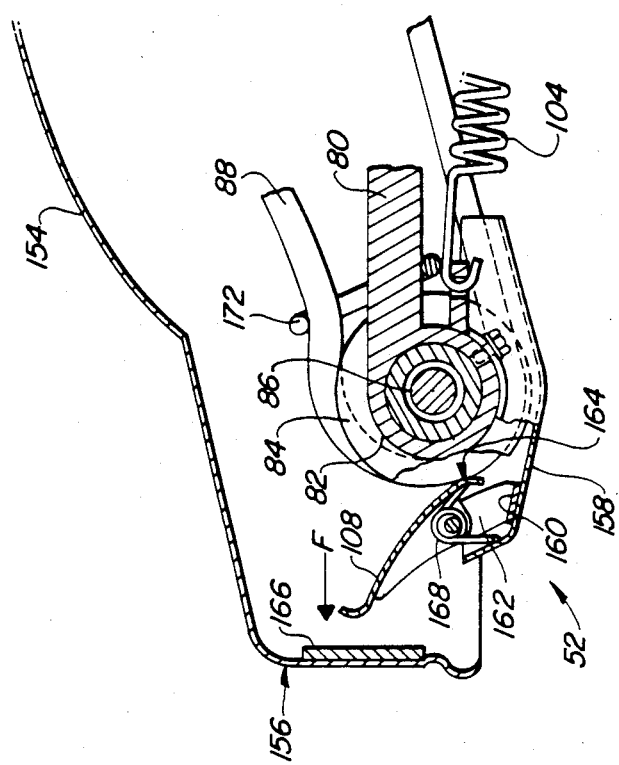
FIG. 5 is an enlarged sectional side view of the belt, driven pulley and braking device when the clutch is disengaged, this view being taken along lines 5-5 of FIG. 4.
Figure 4:
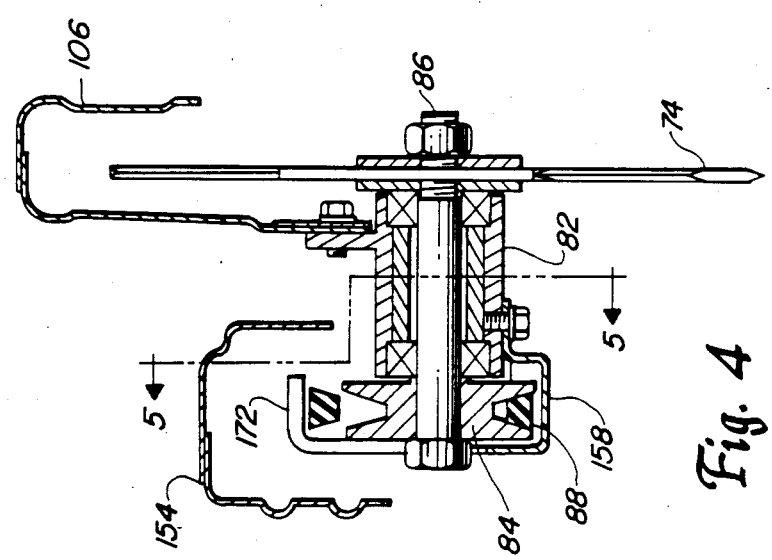
FIG. 4 is an enlarged front view of the belt, driven pulley, blade and braking device when the clutch is disengaged.

As shown in FIGS. 3, 4 and 5, the belt braking device including the above-mentioned pressing lever 108 is arranged between the front end wall 156 of the belt cover 106 and the driven pulley 84. Explaining the braking device with detail, a cover and brake guard 158 for covering or enclosing the lower portion of the driven pulley 84 and the front part of the lower run of the belt 88 and for guiding the lower run of the belt 88 is fixed to the lower portion of the bearing housing portion 82. As shown in FIGS. 5, 6 and 7, bracket 160 having an integral shaft supporting portion 162 is integrally formed on the front part of the cover and brake guard 158, and the pressing lever 108 is rotatably supported by the shaft supporting portion 162.

The pressing lever 108 is provided at its lower end with a pressing portion 164 which is arranged in front of the belt portion entrained to the driven pulley 84 and presses the back (outer peripheral surface) of the belt 88 rearward against the driven pulley 84 when the belt 88 is disengaged. The upper end of the pressing lever 108 is arranged in confronting relation to a forward releasing contact plate 166 (FIG. 5) so that the former is pressed against the latter when the belt 88 is engaged. A pressing torsion spring 168 mounted on the shaft supporting portion 169 biases the pressing portion 164 of the pressing lever 108 rearwardly.

The releasing contact plate 166 is fixedly mounted on the rear surface of the front end wall 156 of the belt cover 154. The belt cover 154 integrally covers the upper, left side, right side, front and rear portions of the entire driving device situated between the driven pulley 84 and the driving pulley 90.

In the vicinity of the front side of the driving pulley 90, at positions situated on common lines $L_1$ and $L_2$ tangential to both pulleys 84 and 90 (see FIG. 2), a pair of upper and lower rear belt guides 170 for guiding the back surfaces (outer peripheral surfaces) of the upper and lower runs of the belt 88, respectively, are provided, which rear belt guides 170 are fixed to the belt cover 154. The rear belt guides 170 are inwardly bent at a right angle with respect to the tangential lines $L_1$ and $L_2$ to also guide the side surface of the belt 88.

In the vicinity of the rear side of the driven pulley 84, at a position situated on the upper common line $L_1$ tangential to both pulleys 84 and 90, a front belt guide 172 for guiding the back surface (outer peripheral surface) of the upper run of the belt 88 is provided, which front belt guide 172 is fixed to the head arm 80.

Next, the operation of the edger 50 will be explained. FIG. 2 shows the condition when the clutch is not applied, that is, disengaged. In this condition, the lever grips 150 of the clutch lever 116 have been returned to a forwardly position, and the front link rod 122 has been shifted forwardly through movement of the rear link rod 126 and relay lever 124. The adjuster 118 of the front link rod 122 has pushed the upper end portion of the push lever 110 forwardly as the rear nut 120 and pin 136 push against it. The head arm 80 has been shifted rearwardly by the rearward spring force of the tension return spring 104, and the bearing housing portion 82 has also been shifted rearwardly. In this situation, the rear end of the driving belt 88 is guided by the guide 170 to be separated from the driving pulley 90, and this disengaged condition is maintained.

In this disengaged condition, as shown in FIG. 5, the upper end of the pressing lever 108 is not in contact with the contact plate 166, and, consequently, the pressing lever 108 is urged by the pressing spring 168 in a direction shown by an arrow F. This causes the pressing portion 164 to press the back of the belt 88 against the driven pulley 84, thus stopping the rotational movements of the belt 88, and the driven pulley 84.

When the clutch is applied so as to initiate the grass trimming operation, as shown in FIG. 3, the clutch lever 116 is rotated rearward from the position shown by a phantom line, by gripping the lever grips 150 against with the handle grips 72.

During rotation of the clutch lever within an initial range of an angle $0_s$ (FIG. 3), the stronger tensioner spring 120 is not expanded, but the weaker tension return spring 104 is expanded forwardly, with the result that the bearing housing portion 82 is shifted forwardly, whereby the belt 88 is engaged. In this case, due to the forward movement of the bearing housing portion 82, the upper end of the pressing lever 108 is abutted against the releasing contact plate 166, thus being rotated clockwise as viewed in FIG. 3, with the result that the pressing portion 164 compresses the pressing spring 168 and is separated from the back of the belt 88 on the driven pulley 84. In this way, the braking device is automatically released.

Subsequently, by rotating the clutch lever 116 up to the final position shown by the solid line in FIG. 3, the tensioner spring 120 expands, thereby applying constant tension to the belt 88. In this final condition, the rear nut 128 becomes slightly shifted to the rear to become disengaged from the slider 134.

The grass trimming operation is performed while gripping the lever grips 150 of the clutch lever 116 against the handle grips 72. When the operator releases the lever grips 72, the bearing housing portion 82 is shifted rearwardly through the action of the tension return spring 104, whereby the clutch is automatically disengaged and at the same time the braking device is automatically applied.

An adjustment of the tension force applied to the belt 88 is effected by adjusting the position of the adjuster 118 For example, when the adjuster 118 is shifted forwardly, the tension force is increased.

The depth of the cut is adjusted by adjusting the height of the front of the frame 58 above the front wheel 60. As the front of the frame 58 is raised by adjusting the front wheel 60, the cutter blade 74 is also raised since it is fixed to the frame 58, thus decreasing the depth of the cut. As the frame 58 is lowered, the cutter blade 74 is also lowered, thus increasing the depth of the cut.

The embodiment shown in FIG. 3 depicts an example of the clutch being applied, such that the lever grips 150 of the clutch lever are shifted in front of the corresponding handle grips 72. HoWeVer, the clutch lever may be so constructed that, when the clutch is applied, the lever grips 150 of the clutch lever are held above the corresponding handle grips 72.

As mentioned above, according to the present invention, the following technical effects can be obtained:

1. Since the engagement of the belt driving device is controlled by the longitudinal movement of the bearing housing portion and since the belt braking device which applies itself in response to the longitudinal movement of the bearing housing portion is arranged between the front end of the belt cover and the driven pulley, the fixed belt cover for covering the entire belt driving device and the braking device can be mounted in a compact fashion, and the mounting structure for the belt cover can be simplified in comparison with that of the conventional divided or swingable structures.

2. Since the braking device is automatically disenergized or energized at the same time the belt is engaged or disengaged, respectively, through the longitudinal movement of the bearing housing portion, by manipulating the clutch, the changing operation for changing the working conditions can be easily effected and the cutter blade can be stopped for a very short time.

3. Since the entire belt driving device is covered or enclosed by a single belt cover, the scattering of the belt when the belt is broken can be prevented.

4. Since the braking action is obtained by pressing the back of the belt against the driven pulley, the belt and the driven pulley can be quickly and effectively stopped when the belt is disengaged, as opposed to a braking structure wherein only the driven pulley is pressed.

5. Since the engagement and disengagement of the belt driving device is effected through the longitudinal movement of the bearing housing portion, the clutch ON-OFF operation can be performed independently of the adjustment of the depth of the cutter, during operation of the edger, and a safety shut-off of the clutch is also provided for when the operator releases the lever grips.

6. Since the braking device is mounted on the bearing housing portion of the driven pulley in such a manner that the braking device can be shifted together with the bearing housing portion, the present invention can also be applied to a belt driving device wherein a rotating surface of the driven pulley is tiltable with respect to the rotating surface of the driving pulley.

7. Since the belt guide for guiding the back surfaces of the upper and lower runs of the belt are provided at positions situated on the common lines tangential to the driving and driven pulleys in the vicinity of the pulleys, the belt can be smoothly guided when the belt is disengaged, and the belt guides serve to help the braking action, thus enhancing the total braking effect.

8. Since the head arm integrally formed with the bearing housing portion is supported for longitudinal movement, the supporting structure for the head arm will be stronger, and, thus, the durability or life of the edger is increased, in comparison with a swing arm supporting structure.

9. Since the head arm is supported for longitudinal movement, the adjuster for adjusting the belt extension or expansion can be easily installed, thus adjusting the tension force according to the extension of the belt, whereby the life of the belt is prolonged.

10. Since the clutch lever is formed as the double-ended lever having the lever grips positioned on both ends thereof, the operator can easily apply and hold the clutch with either hand.

Further, the clutch lever is so constructed that, when the clutch is applied, the lever grips of the clutch lever are positioned in front of or above the corresponding handle grips. During this clutch application condition, the lever grips of the clutch lever and the handle grips can easily be held together by the palm of the operator's hand (not his fingers), thereby facilitating the gripping operation of the clutch lever.

11. The relay lever is so constructed that, when the clutch is applied, the relay lever is inclined to approach the longitudinal direction of the front push rod without exceeding that of the front push rod and the clutch lever is inclined to approach the longitudinal direction of the rear push rod without exceeding that of the rear push rod. In this configuration the lever shaft of the relay lever and the shaft portion of the clutch lever bear the spring forces of the tension return spring and tensioner spring during the final rotation of the clutch lever, whereby the clutch lever can be controlled with a relatively light force.

12. Since the lever shaft of the relay lever extends between the pair of left and right handle stays and is supported by these handle stays, there is no need to use complex parts such as bushings and the like (in comparison with a clutch lever which is supported by a single handle stay), thus simplifying the construction of the supporting mechanism and increasing the strength of such supporting mechanism.

We claim:

1. An edger with a belt braking device, including a belt driving device and a cutter blade which are arranged at a side of an edger vehicle, wherein:

a driven pulley of said belt driving device is supported by a bearing housing portion which supports said cutter blade, and a substantially rearwardly extending head arm is also integrally fixed to said bearing housing portion; a belt is installed between said driven pulley and a rear driving pulley, the belt having a back portion exposed as it encircles the driven pulley; said head arm is supported by said edger vehicle for forward and rearward movement and is biased rearwardly by means of a tension return spring; a belt cover for covering said driving pulley, said driven pulley and the whole belt is fixed to said edger vehicle; and wherein said belt braking device comprises a pressing lever urged by a pressing spring to the back of said belt against said driven pulley, and a releasing contact plate arranged on a front part of said belt cover in confronting relation to said pressing lever; and further wherein, said belt is engaged by pressing a rear portion of said head arm forwardly by means of a push lever, and at the same time, said pressing lever is disengaged from the back of said belt by rotating said pressing lever by pressing it against said contact plate.

2. An edger with a belt braking device, according to claim 1, wherein a pair of left and right upwardly extending operating handles are arranged above handle stays which are positioned at a rear portion of said edger vehicle, and a clutch lever is rotatably mounted in the vicinity of handle grips which are attached to upper ends of the corresponding handles, and said clutch lever is connected to the other end of said push lever through a linkage, and is formed as a double-ended lever having a pair of left and right lever grips at both ends thereof in such a manner that each of said lever grips can be gripped by a hand of an operator together with aid corresponding handle grip.

3. An edger with a belt braking device, according to claim 1, wherein a belt tensioner spring and belt extension adjuster are provided on line rods of said linkage which connects said push lever to said clutch lever.

4. An edger with a belt baking device, according to claim 1, wherein a rotatable relay lever connects a front link rod to said push lever and further connects a rear link rod to said clutch lever, and said relay lever is so arranged that, when said clutch lever is applied, said relay lever is moved generally in the direction of the front link rod or the rear link rod.

5. An edger with a belt braking device, according to claim 1, wherein a rotatable relay lever is connected to a front link rod which is connected to said push lever and the relay lever is also connected with a rear link rod which in turn is connected to said clutch lever, and a lever axis is provided for said relay lever which axis extends between a pair of left and right handle stays, whereby said relay lever is supported by said pair of handle stays.

6. An edger with a belt braking device, according to claim 1, wherein upwardly extending operating handles are arranged above handle says positioned at a rear portion of the edger vehicle; a clutch lever is rotatably mounted in the vicinity of handle grips attached to upper ends of said handles; and said clutch lever is so arranged that when applied, it is shifted above or ahead of said handle grips.

7. An edger including:
a frame with front and side portions;
at least one ground engaging wheel supporting the frame;
power means carried on the frame;
a first pulley coupled with and driven by the power means;
a cutter element; and
mechanism for drivingly engaging the cutter element including:
bracket means carried on the frame including a guide means;
an elongated member carried by the guide means for back and forth movement between first and second positions;
a support housing secured to one end of the member;
shaft means coupled with the support housing;
means mounting the cutter element on the shaft means;
a second pulley coupled with the shaft means;
belt means entrained around the first and second pulleys;
control means for shifting the elongated member between its first position, whereat the second pulley is moved away from the first pulley and the belt means is drivingly engaged with both pulleys and its second position whereat the second pulley is moved towards the first pulley and the belt means is drivingly disengaged;
a brake lever carried by the support housing, mounted for swinging movement between a first position in contact with the belt means and a second position moved away from said belt means;
biasing means urging the lever towards its first position; and
a lever contact surface carried by the frame, said surface being adjacent the brake lever and engageable with the lever when the elongated member is moved to its first position.

8. The invention defined in claim 7, wherein means is further provided between the guide means and the elongated member to permit the elongated member to be swingably adjusted about an axis through its elongated dimension.

9. The invention defined in claim 7, wherein the support housing carries means partially encircling and shielding the lower portion of the second pulley.

10. An edger according to claim 8 having:
a belt tensioner means is operatively connected to the elongated member such that said belt tensioner acts to put tension on the belt when the elongated member is in its first position, and such that said belt tensioner can accommodate the swingable adjustment of the elongated member.

11. The invention defined in claim 7, wherein the frame carries a means shielding the cutter blade and the contact surface is carried by said shielding means.

12. The invention defined in claim 7, wherein spring means acts between the frame and elongated member for urging said member towards its second position.

13. An edger according to claim 7 having
operating handles fixed to the rear of the frame;
a linkage means operatively connected to the elongated member;
a clutch lever means operatively connected to the linkage means such that said clutch lever and operating handles can be held together within either of the operator's hands.

14. An edger according to claim 7 having:
two or more handle stays fixed to and supported by the rear of the frame;
a front link rod operatively connected to the elongated member;
a relay lever operatively connected to the front link rod having
a lever axis supported by and extending through the pair of handle stays;
a rear link rod operatively connected to the relay lever.

15. An edger including:
a frame with front and side portions;
at least one ground engaging wheel supporting the frame;
power means carried on the frame;
a first pulley driven by the power means;
a cutter element;
mechanism for drivingly engaging the cutter blade including bracket means carried on the frame including a guide means;
an elongated member carried by the guide means for back and forth movement between a first and second position;
a support housing secured to one end of the member;
shaft means carried by the support housing;
means mounting the cutter element on the shaft means;
a second pulley carried by the shaft means;
belt means entrained around the first and second pulleys;
control means for shifting the member between its first position, whereat the second pulley is moved away from the first pulley and the belt means is drivingly engaged with both pulleys, and its second position whereat the second pulley is moved towards the first pulley and the belt means is drivingly engaged,
said control means including
a front link rod operatively connected to the elongated member,
a relay lever operatively connected to the front link rod such that said relay lever swings to approach the longitudinal direction of the front link rod as the elongated member is shifted to its first position;
a rear link rod operatively connected to the relay lever, and a clutch lever operatively connected to the rear link rod such that said clutch lever swings to approach the longitudinal direction of the rear link rod as the elongated member is shifted into its first position.

16. An edger according to claim 15 having:
handle stays fixed to the rear of the frame extending upward therefrom;
operating handles fixed to the handle stays;
handle grips formed on the operating handle; and
a linkage mechanism operatively attached to and located proximate to the operating handles such that as the clutch lever is swung to move the elongated member to its first position, said clutch lever is positioned above or ahead of the operating handles.

* * * * *

UNITED STATES PATENT AND TRADEMARK OFFICE
CERTIFICATE OF CORRECTION

PATENT NO. : 4,984,417

DATED : 15 January 1991

INVENTOR(S) : Stephen A. Braun et al

It is certified that error appears in the above-identified patent and that said Letters Patent is hereby corrected as shown below:

ON TITLE PAGE:

Add Kawasaki Jukogyo Kabushiki Kaisha, Kobe, Japan, as co-assignee with Deere & Company, Moline, Illinois Signed and Sealed this Eighteenth Day of August, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO.   :   4,984,417
DATED        :   15 January 1991
INVENTOR(S)  :   Stephen A. Braun et al It is certified that error appears in the above-identified patent and that said Letters Patent is hereby corrected as shown below:

```
Column 10, line 58, delete "aid" and insert --said--;
Column 10, line 61, before "belt" (second occurrence),
insert --a--;
Column 10, line 62, delete "line" and insert --link--,
Column 11, line 14, delete "says" and insert --stays--.
```

Signed and Sealed this

Thirteenth Day of October, 1992

Attest:

DOUGLAS B. COMER

*Attesting Officer*    *Acting Commissioner of Patents and Trademarks*